United States Patent
Blok et al.

(10) Patent No.: US 6,220,326 B1
(45) Date of Patent: *Apr. 24, 2001

(54) TIRE WITH CARCASS PLY RUBBER COMPOSITION

(75) Inventors: Edward John Blok, Wadsworth; Paul Harry Sandstrom, Tallmadge; Bruce Raymond Hahn, Hudson, all of OH (US)

(73) Assignee: The Goodyear Tire & Rubber Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,265

(22) Filed: Mar. 10, 1998

(51) Int. Cl.[7] ................. B60C 1/00; B60C 9/02
(52) U.S. Cl. ............. 152/564; 152/565; 524/495; 524/496
(58) Field of Search .................. 152/564, 565; 524/495, 496

(56) References Cited

U.S. PATENT DOCUMENTS

| | | | | |
|---|---|---|---|---|
| 4,835,209 | * | 5/1989 | Kitagawa et al. | 524/507 |
| 5,017,636 | * | 5/1991 | Hattori et al. | 524/300 |
| 5,382,621 | * | 1/1995 | Laube | 524/496 |
| 5,396,940 | * | 3/1995 | Segatta et al. | 523/437 |

OTHER PUBLICATIONS

Mechanics of Tire, ed. Samuel Clark, U.S. Dept. of Transportation, pp. 207–208, Aug. 1981.*

* cited by examiner

*Primary Examiner*—Michael W. Ball
*Assistant Examiner*—Barbara J. Musser
(74) *Attorney, Agent, or Firm*—Henry C Young, Jr.

(57) ABSTRACT

The present invention relates to a tire with a carcass ply component having a rubber composition of relatively low carbon black content with the carbon black having a defined structure and particle size.

10 Claims, No Drawings

TIRE WITH CARCASS PLY RUBBER COMPOSITION

FIELD

This invention relates to a tire having a carcass ply component with a rubber composition having a low carbon black content where the carbon black is of a defined structure and particle size.

BACKGROUND OF THE INVENTION

Pneumatic rubber tires are conventionally prepared with a rubber tread and supporting carcass. The carcass is conventionally composed of one or more rubberized cord reinforced plies. Such construction is well known to those having skill in such art.

Here, it is desired to provide such rubber composition which contains a relatively small amount of carbon black reinforcement on the order of about 15 to about 35 phr and in the absence, or at least substantial absence, of silica and accompanying silica coupling agent.

It is recognized that in U.S. Pat. No. 5,396,940 a carcass ply rubber composition has been disclosed which is composed of 5–95 phr of epoxidized natural rubber, 5–85 phr of silica, a silica coupler, carbon black which can be a carbon black such as N299, which can also contain 95–5 phr of other rubbers including natural rubber and cis 1,4-polybutadiene rubber.

In the description of this invention, the term "phr" where used means "parts of material by weight per 100 parts by weight of rubber".

SUMMARY AND PRACTICE OF THE INVENTION

In accordance with this invention a tire comprised of a tread and supporting carcass wherein said carcass contains at least one ply comprised of a cord reinforced rubber composition and wherein said carcass ply rubber composition is comprised of, based on 100 phr of rubber, (A) about 60 to about 90 phr of natural cis 1,4-polyisoprene rubber and about 10 to about 40 phr of cis 1,4-polybutadiene rubber, (B) about 15 to about 35, alternatively about 20 to about 30, phr of carbon black having a D B P value in a range of about 110 to about 135 cm$^3$/100 g and an Iodine adsorption value in a range of about 90 to about 120 g/kg, and (C) about 2 to about 8 phr of rosin acid.

In practice, the rubber composition for the carcass ply is often referred to as a ply coat.

Conventionally, the carcass ply component of the tire is a cord reinforced element of the tire carcass. Often two or more carcass ply components are used in a tire carcass. The carcass ply component itself is conventionally a multiple cord reinforced component where the cords are embedded in a rubber composition which is usually referred to as a ply coat. The ply coat rubber composition is conventionally applied by calendering the rubber onto the multiplicity of cords as they pass over, around and through relatively large, heated, rotating, metal cylindrical rolls. Such carcass ply component of a tire, as well as the calendering method of applying the rubber composition ply coat, are well known to those having skill in such art.

The importance of using a relatively low level of carbon black reinforcement for the ply coat, is to endeavor to achieve a high rebound value and relatively low hysteresis for the rubber composition which is intended, ultimately, to enhance (reduce) the tire's rolling resistance. Because a relatively small amount of carbon black reinforcement is to be used, it was decided to try a higher than normal structured (higher reinforcing) carbon black than what might be used for a carcass ply rubber, more of the type of rubber which might be used for a tire tread rubber composition.

The importance of using natural rubber for the ply coat is to endeavor to obtain a relatively high shear strength, low hysteresis and good processability during the calendering of the ply coat onto the cord reinforcement.

It is desired to use cis 1,4-polybutadiene rubber as an elastomer in the ply coat rubber composition to contribute to a relatively low hysteresis and improved compound aging.

The importance of using rosin acid for the ply coat rubber composition is to endeavor to achieve good cured adhesion to the ply cords while maintaining good, original and aged tack. Various rosin acids can be used, particularly natural occurring rosin acids, although they might be refined somewhat. Representative of such rosin acids are, for example, wood rosin, tall oil rosin and gum rosin. Such rosin acids and their use in rubber compositions are well known to those having skill in such art.

In a practice of this invention, it is preferred that the rosin acid is utilized in place of more conventional phenolic resin which are more commonly used for enhancing tack for a rubber composition. This is because, for the purposes of this invention, it is considered herein that such the phenolic resins would provide the necessary building tack but have been observed to cause a reduction in cord adhesion.

For the practice of this invention, it is intended to not use silica reinforcement, at least not any substantial amount of silica, (10 phr or 5 phr or less and preferably zero amount) since it is desired, for this invention, that the amount of reinforcing filler, including the specified carbon black, be kept relatively low. Therefore, a greater reinforcing effect of the carbon black, particularly a relatively high structure carbon black is desired to offset the use of a relatively small amount of carbon black.

It is also intended to not use epoxidized natural rubber for the ply coat rubber composition because it is envisioned that such rubber would tend to cause an unwanted higher hysteresis for the ply coat rubber composition.

Accordingly, for the practice of this invention, it is preferred that the carcass ply rubber composition is exclusive of any appreciable amount, particularly of any amount of (1) epoxidized natural rubber, (2) phenolic, particularly synthetic phenolic, tackifiers, (3) silica, (4) silica coupler and/or (5) additional carbon black having a D B P value of less than 100 cm$^3$/100 g and Iodine No. value of less than 90 g/kg.

If desired, up to about 10, such as about 5 to about 10, phr of additional rubber may be included in the ply coat rubber composition selected from at least one of medium vinyl polybutadiene rubber (40–60 percent vinyl), styrene-butadiene rubber, styrene-isoprene rubber and styrene-isoprene-butadiene rubber.

The D B P and Iodine value characterizations of carbon black are well known and a reference to such values relating to carbon black and ASTM methods of their determination may be found in *The Vanderbilt Rubber Handbook*, 13$^{th}$ edition (1990), pages 416–419.

In general, the D B P value tends to relate to what is known as the structure of the carbon black. Relatively high structure carbon blacks are typically used for reinforcing tire tread rubber compositions such as those having a D B P (dibutylphthalate) value in a range of about 100 to about 160 cm³/100 g. Carcass ply rubber compositions usually use a lower structure carbon black reinforcement such as those having a D B P value in a range of about 80 to about 100 cm³/100 g.

Significantly, for the purposes of this invention a relatively low level of carbon black is used for the carcass ply rubber composition in order to endeavor to achieve higher rebound and reduced hysteresis. Therefore, it is envisioned herein that a higher structure carbon black with a D B P value in a range of about 110 to about 135 cm³/100 g be used in order to provide enough reinforcement.

Further, it is desired to use a carbon black reinforcement with a finer particle size than what may normally be used for a carcass ply rubber composition as indicated by the carbon black's Iodine No. value which, in turn, is a surface area indicator.

Significantly, carbon blacks used for carcass ply reinforcement are usually of a relatively large particle size characterized by having an Iodine No. value in a range of about 30 to about 60 g/kg, whereas smaller carbon blacks are often used for tread rubber usually having a Iodine No. value in a range of about 80 to about 140 g/kg.

For this invention, it is envisioned that a smaller than typical carcass ply carbon black be used with an Iodine Number value in a range of about 90 to about 120 g/kg.

In practice, cords of various compositions may be used for the carcass ply such as, for example, but not intended to be limiting polyester, aramid and nylon. Such cords and their construction, whether monofilament or as twisted filaments, are well known to those having skill in such art.

It is recognized that conventional compounding ingredients may be used in the preparation of the ply coat rubber composition. The ply coat, in the finished tire is sulfur cured as a component of the tire. For example, the sulfur cured ply coat rubber composition may contain conventional additives including reinforcing agents, fillers, peptizing agents, pigments, stearic acid, accelerators, sulfur vulcanizing agents, antiozonants, antioxidants, processing oils, activators, initiators, plasticizers, waxes, pre-vulcanization inhibitors, extender oils and the like. Representative of conventional accelerators may be, for example, amines, guanidines, thioureas, thiols, thiurams, sulfenamides, dithiocarbamates and xanthates which are typically added in amounts of from about 0.2 to about 3 phr. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent but generally range from about 0.1 phr to about 3 phr with a range of from about 0.5 phr to about 2 phr being preferred. Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred. Amine based antidegradants, however, are not preferred in the practice of this invention. Representative of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include, for example aliphatic, naphthenic and aromatic oils. The processing oils may be used in a conventional amount ranging from about 0 to about 30 phr with a range of from about 5 to about 15 phr being more usually preferred. Initiators are generally used in a conventional amount ranging from about 1 to 4 phr with a range of from about 2 to 3 phr being preferred.

Accelerators may be used in a conventional amount. In cases where only a primary accelerator is used, the amounts range from about 0.5 to about 2 phr. In cases where combinations of two or more accelerators are used, the primary accelerator is generally used in amounts ranging from 0.5 to 1.5 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Pneumatic tires are conventionally comprised of a generally toroidal shaped carcass with an outer circumferential tread adapted to the ground contacting space beads and sidewalls extending radially from and connecting said tread to said beads. The tread may be built, shaped, molded and cured by various methods which will be readily apparent to those skilled in the art.

The sulfur cured ply rubber composition of the present invention may be integral with and adhere to various tire carcass substrate rubber compositions.

The practice of this invention is further illustrated by reference to the following examples which are intended to be representative rather than restrictive of the scope of the invention. Unless otherwise indicated, all parts and percentages are by weight.

EXAMPLE

Rubber compositions containing the materials set out in Table 1 were prepared in a B R Banbury using three separate stages of addition, namely a non-productive mixing stage for a total of about 4 minutes to a temperature of about 160° C. followed by a productive mixing stage for about 2 minutes to a temperature of about 105° C. where the sulfur and curatives were added. The terms "non-productive" and "productive" as used for mixing stages for mixing rubber compositions are well known to those having skill in such art.

The following Table 1 illustrates the rubber compositions with composition A representing a control (Ctrl A); compositions B and C representing additional sample preparations (Exp B and Exp C) and experimental composition D (Exp D) is representative of a composition of this invention.

TABLE 1

| Material | Ctrl A | Exp B | Exp C | Exp D |
|---|---|---|---|---|
| Productive Mix Stage | | | | |
| Natural rubber[1] | 70 | 70 | 70 | 70 |
| Cis 1,4-polybutadiene[2] | 0 | 30 | 30 | 30 |
| Emulsion SBR[3] | 30 | 0 | 0 | 0 |
| Carbon black, N660 | 60 | 0 | 0 | 0 |
| Carbon black, N299 | 0 | 28 | 28 | 28 |
| Processing oil[4] | 14.9 | 10 | 10 | 10 |
| Phenolic tackifier[5] | 3.5 | 4.0 | 0 | 0 |
| Rosin acid[6] | 0 | 0 | 0 | 4 |

TABLE 1-continued

| Material | Ctrl A | Exp B | Exp C | Exp D |
|---|---|---|---|---|
| Productive Mix Stage | | | | |
| Zinc oxide | 2 | 2 | 2 | 2 |
| Sulfur | 2.1 | 2.4 | 2.4 | 2.4 |
| Sulfenamide Accelerator(s) | 1.6 | 1.8 | 1.8 | 1.8 |

[1]Cis 1,4-polyisoprene.
[2]Obtained as BUDENE ® 1208 from The Goodyear Tire & Rubber Company.
[3]Obtained as PLF 1778 from The Goodyear Tire & Rubber Company-contains 37.5 phr naphthalene/paraffinic processing oil and 23.5 percent styrene with a Mooney viscosity (ML1 + 4) of about 50. It is reported in Table 1 on a dry weight basis.
[4]Additional naphthenic/paraffinic rubber processing oil.
[5]Obtained as SP-1068 from the Schenectedly Chemical Company.
[6]A natural water white Chinese gum rosin obtained from the Harwick company.

The rubber compositions were cured for about 18 minutes to a temperature of about 150° C. The physical properties of the rubber compositions are shown in the following Table 2.

TABLE 2

| Material | Ctrl A | Exp B | Exp C | Exp D |
|---|---|---|---|---|
| Rheometer, 170° C. | | | | |
| Maximum Torque (MPa) | 30.3 | 33.8 | 36.8 | 31.0 |
| Minimum Torque (MPa) | 5.5 | 6.2 | 7.0 | 5.5 |
| T$_{90}$, minutes | 2.9 | 2.8 | 2.8 | 3.3 |
| Stress-Strain | | | | |
| Tensile, Mpa | 17.0 | 15.6 | 14.6 | 15.4 |
| Elongation at Break, % | 525 | 577 | 490 | 591 |
| 300% Modulus, MPa | 8.7 | 5.2 | 6.6 | 4.9 |
| Hardness, Shore A | | | | |
| 100° C. | 50 | 46 | 58 | 46 |
| Rebound | | | | |
| 100° C. | 68 | 74 | 77 | 73 |
| Peel Adhesion (Tear)[1] | | | | |
| Newtons | 89 | 67 | 60 | 81 |
| Tack (MPa) | | | | |
| Original | 10 | 16 | 9 | 17 |
| Aged 7 days at 23° C. | 20 | 21 | 2 | 20 |
| Adhesion to Polyester Cord[1] | | | | |
| Newtons | 116 | 88 | 110 | 129 |
| Percent Coverage | 100 | 70 | 100 | 100 |
| Pierced Groove Flex | | | | |
| 120/180/240 minutes, Fail or inches of crack growth | 1.6/ F/— | 1.3/ F/— | F/— /— | 0.54/ 1.4/F |

[1]The peel adhesion and cord adhesion tests are described in U.S. Pat. No. 5,328,963.

These results show that the natural rubber/polybutadiene rubber ply coat rubber composition with a relatively low level of defined carbon black (28 phr) together with a rosin acid, represented by Exp D, demonstrated good tack which is useful in tire building, high cord adhesion useful for tire component durability and a desirable high rebound value useful for enhancing a tire's rolling resistance.

The results further indicate that the Exp D sample had the best flex fatigue resistance according to the Groove Flex test which is considered herein to be a beneficial value for a tire tread rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A tire comprised of a tread and supporting carcass wherein said carcass contains at least one carcass ply comprised of a cord reinforced rubber composition, wherein said cord is composed of a monofilament or of twisted filaments and wherein said cord reinforced rubber composition is comprised of, based on 100 phr of rubber, (A) rubber consisting essentially of about 60 to about 90 phr of natural cis 1,4-polyisoprene rubber about 10 to about 40 phr of cis 1,4-polybutadiene rubber wherein said cis 1,4-polybutadiene rubber consists of cis 1,4-polybutadiene rubber, and up to about 10 phr of at least one rubber selected from medium vinyl polybutadiene rubber (40 to 60 percent vinyl), styrene-butadiene rubber, styrene-isoprene rubber and/or styrene-isoprene-butadiene rubber, (B) about 15 to about 35 phr of carbon black having a D B P value in a range of about 100 to about 130 cm$^3$/100 g and an Iodine adsorption value in a range of about 90 to about 120 g/kg, and (C) about 2 to about 8 phr of tack and adhesion enhancing rosin acid; wherein said rosin acid is a natural rosin acid selected from at least one of wood rosin, tall oil rosin and gum rosin, and wherein said cord reinforced rubber composition is exclusive of any appreciable amount of epoxidized natural rubber, phenolic tackifier and silica.

2. The tire of claim 1 wherein said carcass ply rubber, composition is exclusive of any appreciable amount of phenolic tackifiers.

3. The tire of claim 1 wherein said carcass ply rubber composition is exclusive of any appreciable amount of silica and silica coupler.

4. The tire of claim 1 wherein said carcass ply rubber composition is exclusive of any appreciable amount of carbon black reinforcement having a D B P value less than 110 cm$^3$/100 g and an Iodine No. value of less than 90 g/kg.

5. The tire of claim 1 wherein said carcass ply rubber composition exclusive of any appreciable amount of phenolic tackifier, silica and carbon black reinforcement having a D B P value of less than 110 cm$^3$/100 g and Iodine Number value of less than 90 g/kg and where said rosin acid is selected from at least one of wood rosin, tall oil rosin and gum rosin.

6. The tire of claim 5 wherein said cord reinforcement for said carcass ply is selected from at least one of polyester, aramid and nylon cords.

7. The tire of claim 1 wherein said cord reinforcement for said carcass ply is selected from at least one of polyester, aramid and nylon cords.

8. The tire of claim 1 wherein said carcass ply rubber composition contains from about 5 to about 10 phr of at least one additional elastomer selected from at least one of medium vinyl polybutadiene rubber (40 to 60 percent vinyl), styrene/butadiene rubber, styrene/isoprene rubber and styrene/isoprene/butadiene rubber.

9. The tire of claim 5 wherein said carcass ply rubber composition contains from about 5 to about 10 phr of at least one additional elastomer selected from at least one of medium vinyl polybutadiene rubber (40 to 60 percent vinyl), styrene/butadiene rubber, styrene/isoprene rubber and styrene/isoprene/butadiene rubber.

10. The tire of claim 1 wherein said carcass ply rubber composition contains about 15 to about 30 phr of said carbon black and is exclusive of phenolic tackifier, silica and carbon black reinforcement having a D B P value of less than 110 cm$^3$/100 g and Iodine Number value of less than 90 g/kg.

* * * * *